Feb. 1, 1938.                L. McCULLOCH                2,106,850
                       METHOD OF INSULATING CONDUCTORS
                           Filed June 1, 1935
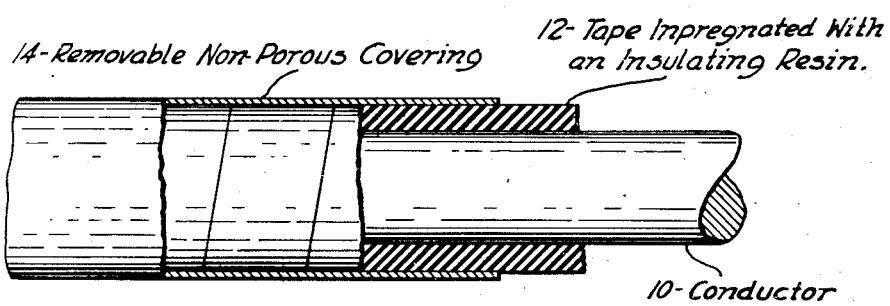
WITNESSES:                                          INVENTOR
  Michael Stark                                   Leon McCulloch.
  James N. Ely                                   BY Ezra N. Savage
                                                      ATTORNEY Patented Feb. 1, 1938

2,106,850

UNITED STATES PATENT OFFICE 2,106,850

METHOD OF INSULATING CONDUCTORS

Leon McCulloch, Pittsburgh, Pa., assignor to Westinghouse Electric & Manufacturing Company, East Pittsburgh, Pa., a corporation of Pennsylvania Application June 1, 1935, Serial No. 24,581

3 Claims. (Cl. 173—264)

This invention relates generally to insulated electrical conductors, and particularly to a method of insulating electrical conductors.

Where varnishes and resins have been employed in impregnating taped electrical conductors to insulate them, it has been found quite difficult to effect a uniform insulation of the tape. In the hardening processes heretofore employed, the conductors covered with the impregnated tape were immersed in hot asphalt and pressure was applied to cause the hot asphalt to fill the voids in the impregnated tape or to force the impregnating resin in the tape to flow and fill the voids.

In employing such a process, the hot asphalt penetrates through and flows around and beneath the outer layers of the tape with the result that equal pressure is not exerted on all parts of the outer surface and a less dense insulating coating is produced. Such non-uniformly insulated conductors are dangerous.

An object of this invention is to provide a method of insulating electrical conductors whereby the conductors will have a dense and uniform insulating coating.

A further object of this invention is to provide for so protecting the insulating coverings of electrical conductors during the process of insulating them, that the conductors will have a dense and uniform insulating coating.

Another object of this invention is to produce an insulated conductor which will have a uniformly dense insulating coating.

Other objects of this invention will become apparent from the following description when taken in conjunction with the accompanying drawing in which the single figure, partly in section, illustrates a conductor 10 wound with an impregnated insulating tape 12 and covered with a removable non-porous covering 14 as will be explained more fully hereinafter.

According to this invention, tape coverings for electrical conductors are impregnated with a styrol resin solution and the resulting impregnated and covered conductors are subjected to a process for polymerizing the resin whereby a dense and uniform insulating coating is provided for the conductor.

In order to secure a satisfactory impregnation of the tape usually employed in insulating conductors, it has been found to be desirable to thoroughly cleanse the tape of resin and deleterious material before the impregnating resin is applied. In practice, tape comprising paper, mica flakes and asphaltic "sticking" varnish may be cleansed by treating the tape with benzol to extract the asphaltic varnish. Since benzol is quite volatile, it is easily removed by drying the tape.

The cleansed mica tape is impregnated with an insulating medium such as liquid styrene or other suitable styrol resin solutions which may be polymerized and hardened without loss of volatile solvents. A satisfactory impregnating solution for the mica tape which will produce an insulated winding having a low power factor has been found to comprise about 150 g. of polystyrol resin, about 600 g. of monostyrol stabilized with hydroquinone and about 3.3 g. of benzoyl peroxide which is employed as an accelerator. When the tape is thoroughly impregnated with the insulating resin as by dipping, it is wound around the conductor. Instead of impregnating the tape prior to winding the conductor, the conductor may be wound with unimpregnated tape and then the taped conductor may be dipped into the insulating resin solution to thoroughly impregnate it.

In order to prevent the loss of volatile styrene from the impregnated tape and in order that pressure may be exerted equally about the conductor when it is subjected to the polymerization and hardening treatment, a cover is provided around the wound conductor which will effectively maintain the impregnating solution in the tape while excluding foreign matter from entering.

The covering around the tape wound conductor comprises a soft and pliable non-porous sheet material which is easily wrapped around the conductor and held in place. In practicing this invention metal foil is preferably employed as the protective covering but other non-porous material such as cellophane or varnished fabric may be used. When metal foil is employed, a temporary layer of cotton tape may be employed between the metal foil and the conductor to facilitate in removing the metal foil after the insulating resin is hardened.

The resin impregnated tape is polymerized and hardened around the conductor by immersing the conductor covered with the metal foil in hot asphalt in an autoclave and applying pressure. When the pressure is applied, it will be found that the metal foil covering the conductor effectively excludes the hot asphalt from penetrating through and flowing in under the turns of the tape. As a result of preventing the asphalt from flowing in under the mica tape, the full hydrostatic pressure developed in the autoclave is exerted with equal force throughout the entire outer surface of the windings of the conductor.

This equal pressure causes the impregnated tape to harden into a dense and uniform insulating structure around the conductor.

When the insulating resin is hardened, the tape firmly adheres to the conductor, then the conductor is removed from the autoclave and the protective coverings of cotton tape and metal foil are removed from around the insulated conductor. Conductors which have been wrapped with tape impregnated with a styrol resin solution which is capable of being polymerized and which have been hardened by the hereinbefore described methods have been found to be uniformly insulated. Further, this type of insulation has been found to have a very low power factor.

While a specific method has been described embodying this invention, it is to be understood that this invention is not to be limited to the exact details disclosed, except as is necessitated by the prior art and the scope of the appended claims.

I claim as my invention:

1. In the method of insulating conductors, in combination, impregnating tape with an insulating solution of polystyrol in monostyrol, winding the conductors to be insulated with the impregnated tape, covering the wound conductor with a pliable non-porous sheet material to protect it, immersing the covered conductor in hot resin and applying pressure thereto to harden the insulating solution, removing the conductor from the hot resin when the insulating solution is hardened, and removing the non-porous sheet material from the insulated conductor.

2. In the method of insulating conductors, in combination, impregnating tape comprising sheets of paper and mica which are free of foreign substances with a styrol resin solution, winding the impregnated tape on the conductors to be insulated, covering the wound conductor with a pliable non-porous sheet material, immersing the covered conductor in hot resin and applying pressure thereto to harden the styrol resin solution, removing the conductor from the hot resin when the styrol resin solution is hardened, and removing the non-porous sheet material from the insulated conductor.

3. In the method of insulating conductors, in combination, impregnating tape with an insulating solution of benzoyl peroxide, monostyrol and polystyrol resin, winding the impregnated tape on the conductors to be insulated, covering the wound conductors with a pliable non-porous sheet material to protect it, immersing the covered conductors in hot resin and applying pressure thereto to harden the resin impregnated tape, the non-porous sheet material covering the impregnated tape and so equalizing the pressure applied to the wound conductors that the insulating coating will be uniform and dense, removing the conductors from the hot resin when the insulating resins are hardened, and removing the non-porous sheet material from the insulated conductors.

LEON McCULLOCH.